United States Patent [19]

Gnanamuthu

[11] 4,401,726
[45] Aug. 30, 1983

[54] METAL SURFACE MODIFICATION

[75] Inventor: Daniel S. Gnanamuthu, Weymouth, Mass.

[73] Assignee: Avco Everett Research Laboratory, Inc., Everett, Mass.

[21] Appl. No.: 332,964

[22] Filed: Dec. 21, 1981

Related U.S. Application Data

[63] Continuation of Ser. No. 26,875, Apr. 4, 1979, abandoned, which is a continuation-in-part of Ser. No. 611,628, Sep. 8, 1975, Pat. No. 4,015,100, and a continuation-in-part of Ser. No. 431,240, Jan. 7, 1974, abandoned.

[51] Int. Cl.³ .............................................. B05D 3/06
[52] U.S. Cl. .................................. 428/610; 29/156.5 R; 29/156.7 A; 219/121 LF; 427/53.1
[58] Field of Search ............... 427/53.1; 219/121 LM, 219/121 L, 121 LF, 121 LA; 29/156.5 R, 156.7 A; 428/610

[56] References Cited

U.S. PATENT DOCUMENTS

| 3,117,846 | 1/1964 | Chao | 427/383.7 |
|---|---|---|---|
| 3,594,219 | 7/1971 | Maxwell et al. | 427/383.7 |
| 3,637,374 | 1/1972 | Holzi et al. | 75/135 X |
| 3,935,417 | 1/1976 | Umino et al. | 219/121 EM |
| 3,961,098 | 6/1976 | Bessen | 427/191 X |
| 3,991,229 | 11/1976 | Fengler | 427/53.1 |
| 4,015,100 | 3/1977 | Gnanamuthu et al. | 219/121 LM |
| 4,059,461 | 11/1977 | Fan et al. | 427/53.1 X |
| 4,122,240 | 10/1978 | Banas et al. | 427/53.1 X |
| 4,125,926 | 11/1978 | Gale et al. | 427/53.1 X |
| 4,157,923 | 6/1979 | Yen et al. | 427/53.1 X |

FOREIGN PATENT DOCUMENTS 2509190  11/1975  Fed. Rep. of Germany ..... 427/53.1

*Primary Examiner*—Thurman K. Page
*Attorney, Agent, or Firm*—M. E. Frederick; Jerry Cohen

[57] ABSTRACT

Properties of the surface of low melting substrate parts including low melting, high conductivity reactive metal parts, are modified by forming an alloy casing thereon having the metal of the substrate as a first (matrix) component thereof together with a higher melting material as the second (reinforcing) component. The higher melting component is coated on the substrate, melted under laser heating, with gas shielding to avoid oxidation, and mixed with a melted portion of the substrate through convective circulation and the mixture is rapidly cooled to produce the alloy casing. Then the casing may be rescanned with the laser beam to rapidly melt and resolidify the casing with refined grain structure. Such grain refining may also be applied to uncoated substrates.

16 Claims, 8 Drawing Figures

(2000 X)

(100 X)

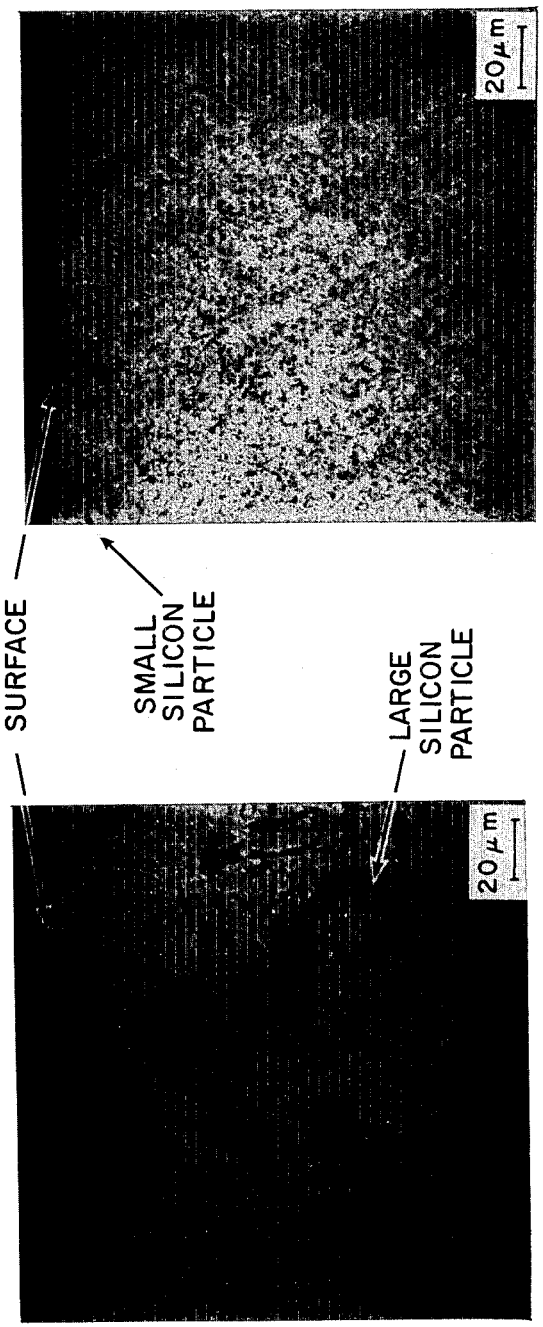
Fig. 6 (500X)
Fig. 7 (500X)

METAL SURFACE MODIFICATION

CROSS REFERENCE TO RELATED APPLICATIONS

This is a continuation of application Ser. No. 026,875, filed Apr. 4, 1979, now abandoned, which is a continuation-in-part of the copending application Ser. No. 611,628, filed Sept. 8, 1975, by myself and E. Locke, now U.S. Pat. No. 4,015,100, granted Mar. 29, 1977, a continuation-in-part of application Ser. No. 431,240, filed Jan. 7, 1974, now abandoned. The disclosure of such applications is incorporated herein by reference as though set out at length herein.

BACKGROUND OF THE INVENTION

The present invention relates to surface modification of fabricated or semifabricated low melting reactive metal parts, particularly of aluminum magnesium in elemental or alloy forms, and more particularly to producing changed physical or chemical properties on metal, e.g., hardened surfaces.

There are many known and long practiced methods for improving the resistance of surfaces of fabricated or semi-fabricated metal (including elements, alloys and compounds) to wear, galling, deformation, corrosion, heating and/or erosion. Such prior art and its limitations are elaborated in the above referenced U.S. applications which also disclose a method of laser melting and alloying a low or not substantially higher melting point coating with a higher melting point substrate to produce resistant surfaces in a way overcoming such limitations.

My U.S. Pat. Nos. 3,952,180 (sole) and 4,015,100 (with E. Locke) disclose, respectively, cladding and surface alloying methods overcoming above problems and I now disclose an improvement applicable to surface enhancing low melting reactive metal substrates by mixture of a coating therewith and/or melting it.

It is an important object of the present invention to provide an improvement in metal wear resistance protection and related arts in respect of extending the method capabilities of such art(s) and/or producing improved products and more particularly blending high melting point surface coating with a lower melting substrate to produce a modified surface in a high volume percentage, i.e. including above 50% of high melting coating material.

It is a further object of the invention to provide high density, low porosity, modified surface layers consistent with one or more of the preceding objects.

It is a further object of the invention to provide surface layer treatment which is tolerant of difficult geometries, including reentrants and remote surface regions, consistent with one or more of the preceding objects.

It is a further object of the invention to provide surface layering, without regard to electrical or magnetic field conditions which may exist in the region or surface to be treated or which may develop in the course of processing, consistent with one or more of the preceding objects.

It is a further object of the invention to utilize low cost base or workpiece materials, with respect to initial selection and quantity and in limitation of quantity of usage, consistent with one or more of the preceding objects.

It is a further object of the invention to minimize the costs in labor, materials and/or time of ancillary machining and/or heating steps related to surface layering, consistent with one or more of the preceding objects.

It is a further object of the invention to provide flexibility of process control consistent with one or more of the proceding objects.

It is a further object of the invention to minimize incidental effects on the substrate below the surface layer consistent with one or more of the preceding objects.

It is a further object of the invention to provide a surface layer with selectively coarse or fine microstructure consistent with one or more of the preceding objects.

It is a further object of the invention to provide minimal working time and related substrate preparation and post treatment time consistent with one or more of the preceding objects.

SUMMARY OF THE INVENTION

According to the invention, a substrate part is coated with high melting reinforcing ingredients to reinforce the substrate in a surface layer thereof. The coating and a surface layer of the substrate are melted to a preselected depth of the latter, through application of a focused beam of radiant energy to limited surface area regions on the order of 0.001 to 0.7 sq. inches and relative scanning of the radiant energy beam and surface is conducted to sequentially melt and resolidify to an essentially constant depth and width under essentially uniform conditions throughout the linear scan, to define a desired pattern of surface modification. The work is well shielded to prevent oxidation of the melted surface layer. The conditions of melting are controlled to induce forced mixing and convective flow of the melted coating material and melted substrate material. Any such region is maintained at molten state for less than two seconds, preferably less than one second, and the substrate provides a very large heat sink to the molten region(s) to assure rapid solidification upon removal of the impacting energy beam. The high rates of cooling during laser melt quenching, comparable to that obtainable heretofore only by splat cooling techniques, are discussed further in the article by Elliot, et al, "Rapid Cooling by Laser Melt Quenching", at Applied Physics Letters, volume 21, No. 1, pages 23-25. July 1972. However, the art understands limitations to any quantitative treatment of the subject due to such phenomenon as porosity artificially generated through vaporization of low boiling point constituents of an alloy metal, as discussed for instance at page 123 of Gagliano et al, "Lasers in Industry", Vol, 57 IEEE Proceedings, No. 2, 1969, pages 114-147. Crystalline microstructures are produced in the invention in contrast to amorphous microstructures through splat cooling.

The process is preferably conducted at atmospheric or superatmospheric pressure [to suppress volatilization of mixture ingredients and to avoid the fixturing, cleanliness and setup time requirements of vacuum processing] and with inert gas shielding.

The transitory zone of energy application for melting may be oscillated locally at 100-1000 Hertz as desired in the above cited applications to further promote mixing of ingredients. Such oscillation may comprise local sweeping of a radiant energy beam and/or modification of the beam contour such as switching between rectangular and round beam shapes.

The alloy casing may be rescanned with the CW laser beam at a faster rate than initial scanning to produce a grain refined (by a factor of 10% or more) alloy casing. The grain refining may be applied to the substrates per se.

The present invention utilizes CW laser equipment and processing techniques described in U.S. Pat. Nos. 3,702,972, 3,721,915, 3,810,043, 3,713,030 and 3,848,104, as well as in the U.S. Pat. No. 3,952,180 and the applications cited above, all of common assignment with present application, said last mentioned U.S. Pat. No. 3,848,104, describing utilization of the equipment in a metal surface heat treatment process which can be conducted in tandem with the same process or as available alternative processes utilizing the same equipment.

Through the process of the present invention, a part can be fabricated from a base metal selected on the basis of cost and/or chemical properties and working surface thereof can be modified to provide necessary characteristics required in a particular application; e.g., high temperature hardness, strength or ductility; wear resistance; corrosion resistance, etc.

These and other objects, features and advantages of the invention will be apparent from the following detailed description with reference therein to the accompanying drawing in which:

BRIEF DESCRIPTION OF THE DRAWING

FIG. 6 is a 2000X section of FIG. 2 and FIGS. 4–5 are depth traces in the said treated surface of composition and hardness, respectively.

FIGS. 7–8 are 500X photomicrographs showing a further aspect of usage of the invention.

DETAILED DESCRIPTION OF PREFERRED EMBODIMENTS

Figure 1:
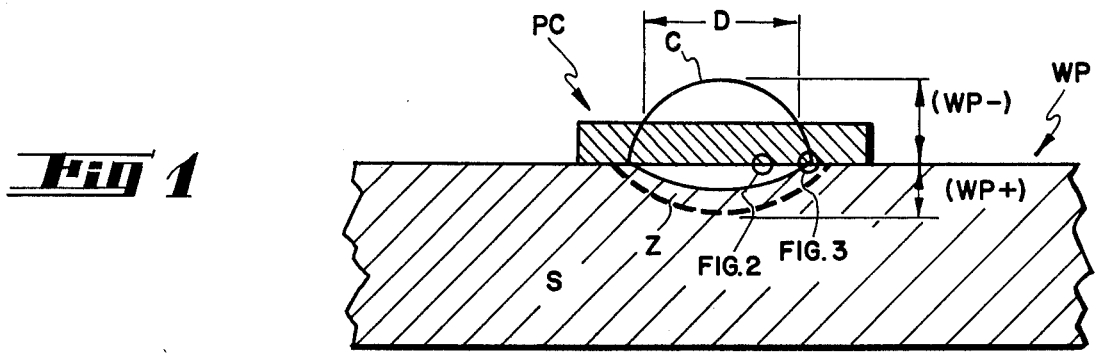
FIG. 1 is a sketch showing a treated surface before and after modification in accordance with a preferred embodiment of the invention.

Referring to FIG. 1, there is shown a base metal substrate S such as an aluminum or magnesium (element or alloy) valve seat or bearing race, or the like, with a powder coating PC which is loose or held together by a volatile binder or semi-sintered, or applied through plasma or flame spray application or painting on with a volatile binder) and preheating to dry the coating of high melting material. The coating may be applied as a dot or stripe in regular geometric forms or as irregular patterning as required in an end use application. In a working example, the powder coating stripe PC was made of loose powder and had a width of 6 mm and height of 1.5 mm and about 50% porosity. A laser beam having a beam diameter D less than the width of PC was scanned longitudinally along the stripe to melt it and a limited depth (less than 50% of PC thickness) of substrate. The molten metals were resolidified, as the scanning laser beam passed on, through heat transfer to the high conductivity heat sink substrate part.

A resolidified composite casing C was formed with a height above the original workpiece surface (WP−) greater than the height of the original powder coating and a depth below the original workpiece surface (WP+) less than half of WP−. A zone Z of grain refined substrate material of less thickness than average casing thickness appears adjacent the casing.

Where the coating is presintered or otherwise pre-agglomerated and mechanically adhered or otherwise bonded to the substrate, the final form of casing C conforms (with slight shrinkage) to the original form of PC.

Within the casing are large particles of silicon in about 70 volume percent in about 30 volume percent matrix of silicon-aluminum eutectic, on average, with a higher concentration of the silicon in the WP− region of the casing than in the WP+ region thereof.

Figure 2:
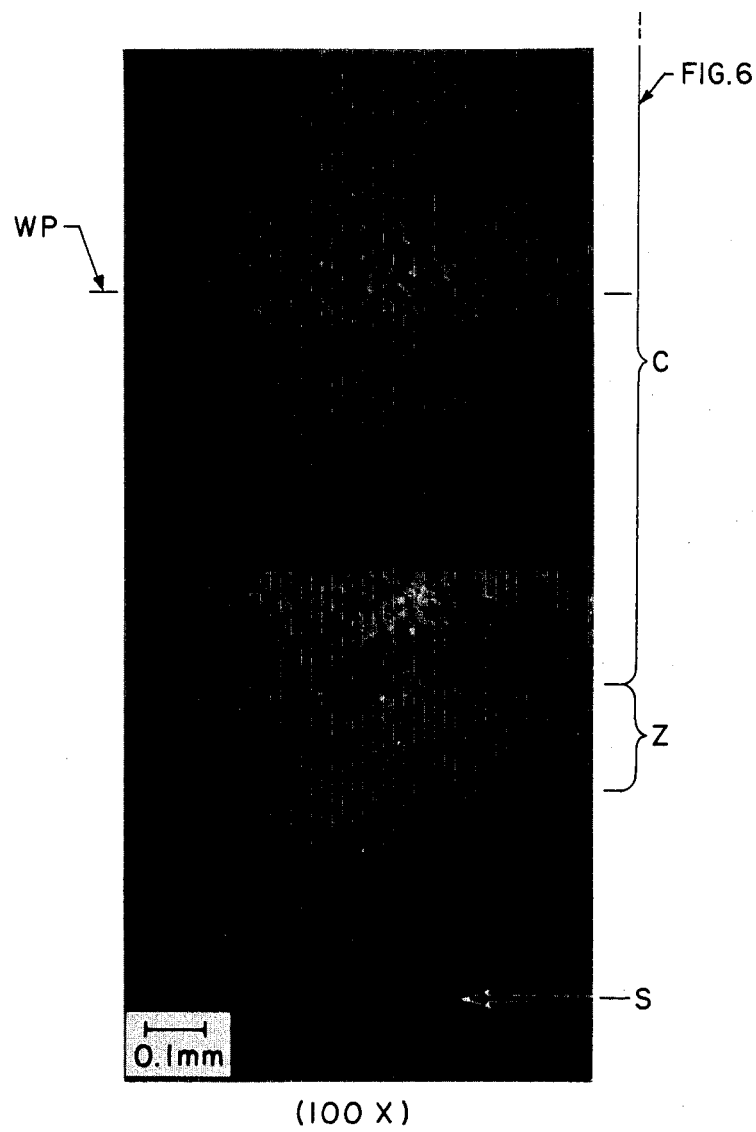
FIGS. 2–3 are 100% photomicrographs of sections of an article treated as indicated in FIG. 1
Figure 5:
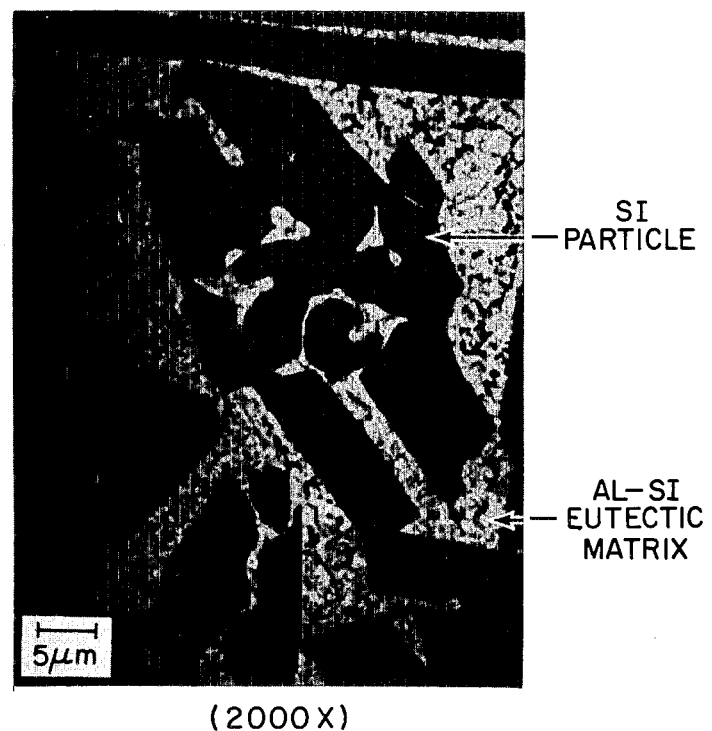
Figure 3:
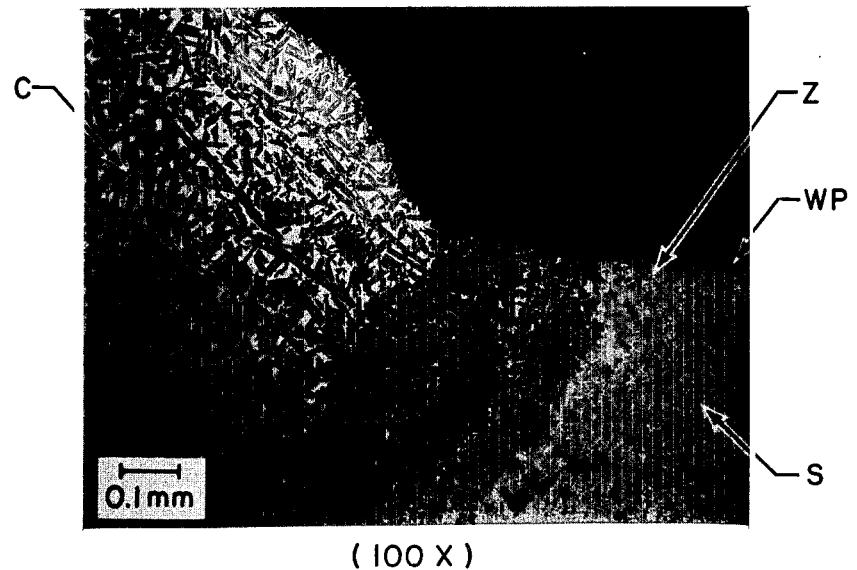

FIGS. 2–3 are 100X magnified cross section photomicrographs of the above example of actual processing of elemental silicon coating on an aluminum alloy (AA390) substrate (half inch thick cast plate form) scanned with f/21 laser beam of 0.2 inches beam diameter of 4.3 kilowatt power at 20 inches per minute processing speed. The FIGS. 2–3 photomicrographs are taken at locations indicated in FIG. 1. FIG. 2 actually compries two such spliced together photomicrographs to show a greater depth.

FIG. 6 is a 2000X magnified photomicrograph taken from within a high silicon density region of the FIG. 2 photomicrograph.

Figure 4:
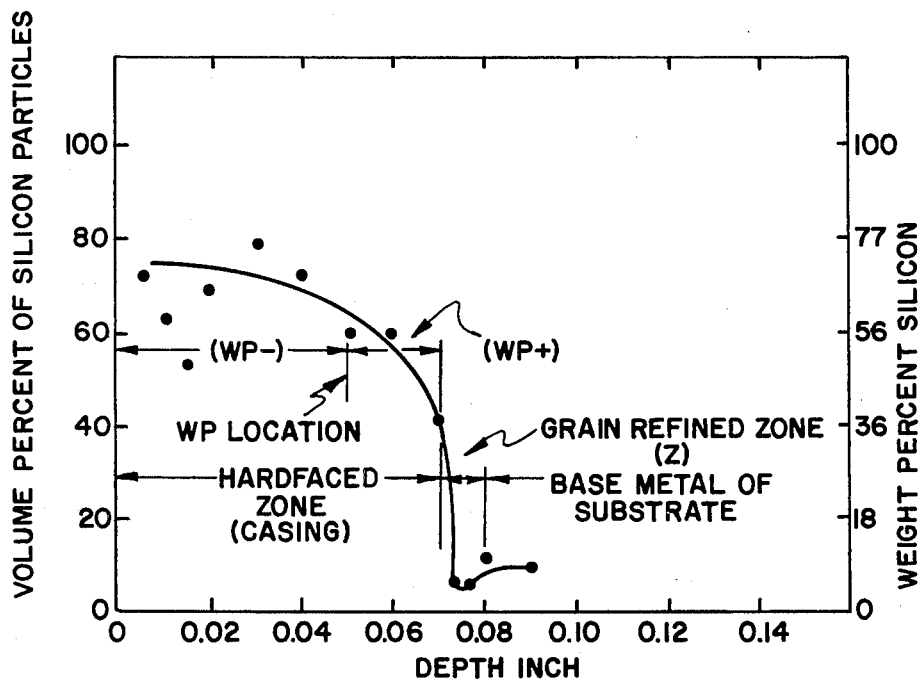
Figure 5:
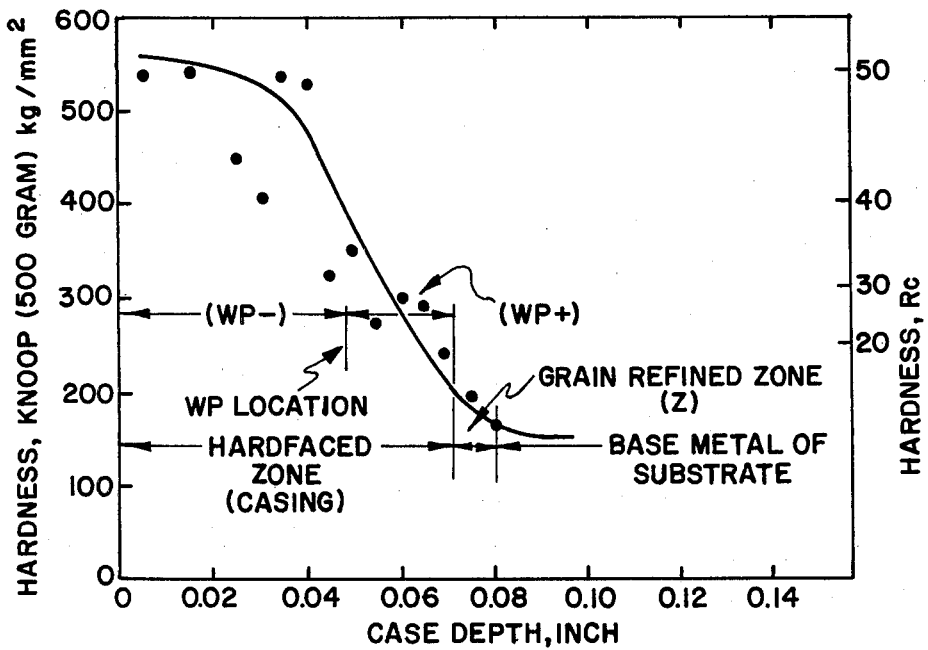

FIGS. 4 and 5 show the silicon composition, and consequent hardness, gradients running from casing surface down through casing depth, such distinct gradient [comprising over 20% gradual change in the WP+ region of casing depth] being in contrast to the homogeneous character of laser alloying described in the above cited applications.

Generally, in practice of the invention, a 1–20 kilowatt laser beam focused to a 0.02 to 0.7 inch diameter circle, or area equivalent of other forms (e.g., squares or rectangles of the same area) is scanned across the surface to be modified at a rate of 5–500 inches per minute with such conditions being adjusted on average to provide slightly (about 20%) more power density than for alloying a low melting coating into the same substrate with high (over 50 weight percent) dilution of coating material and substantially more (about 40%) power density than would be used to clad a coating to the substrate without significant coating composition change. Typical times of residence in the molten state for any given region of surface layer are 0.1 to 1.0 seconds and cooling time for the molten region to 50% or less of the applicable solidus temperature for the alloy composition therein essentially equals heat-up time. During the melting, thermal gradients alone induce a substantial degree of mixing of the ingredients of the coating with the molten surface layer portion. Additionally, it is believed that a pressure wave is induced by the high energy input and this pressure wave further promotes vigorous mixing substantially in a convective recirculation of what is estimated to be 50–200 times around at a given spot in the period of molten or semi-molten state thereof. As the large silicon (or other high melting phase) particles precipitate out the convective recirculation continues in the slurry, so constituted, until the aluminum-silicon matrix freezes. Meanwhile, the initially precipitated silicon particles grow to large size possibly by coalescence (40–100 microns width and 2–5X aspect ratio).

The radiant energy laser beam as described above, may be provided and manipulated by laser apparatus of the type shown in U.S. Pat. Nos. 3,721,915, 3,702,973, 3,577,096, and 3,713,030, and said applications the disclosures of which are incorporated herein by reference as though set out at length.

An energy absorbing undercoat may be used under powder coating PC as described in the above references.

Gas shielding is very important to avoid oxidation of the melt. Typically, a shielding gas flow of helium at 10 cu. ft./hr. (for 20 in./min. laser scan speed) with a trailing shield flow of argon at 10 cu. ft./hr. will be employed at the surface treatment zone.

There have been described then a surface modification process and resultant product meeting the foregoing objects. The time of processing is very short and space, equipment and cost burdens are low. The disturbance of underlying substrate properties below the thin grain defined zone thereof is minimal. Alloys or composite casings are formed by drawing substrate minority components into a reinforcing material wherein the formed casing has a high density (99.9%) matrix with 0.1–10.0 w/o secondary particles of original coating material in the matrix of grain refined substrate material.

Other melting materials (above 1000° C. melting point or liquidus) which may be used as the coating on aluminum or magnesium substrates in accordance with the invention comprise elemental or alloy forms of the metals Mo, W, Cr, V, Hf, Zr, Fe, B, Be, Ni, Co, Ta, Cb, Ti, Pd, Th, Rh, Re, Os, Ir, Pt, Cu, Au, Mn, in elemental or alloy forms or ceramic and refractory materials. The coating may be cast or worked, or otherwise high density consolidated, structure such as wire or sheet in lieu of powdered or other porous or spongy forms.

Through use of the invention, substrates may be of lower rated, and therefore less costly, types where a given requirement—e.g., work hardenability and/or higher density—is mandated for a surface such as a valve seat in an aluminum cylinder head and ring grooves in aluminum pistons for internal combustion engines.

Aluminum has a conductivity of 0.53 cal/cm-sec-°C., magnesium has 0.36 cal/cm-sec-°C. and their alloys are in the same range. Preferably, the present invention is applied to substrates with conductivity in excess of 0.25 cal/cm-sec-°C. and melting point of 400°–800° C. (or liquidus in case of an alloy) and sufficient to assure adequate conductivity for prevention of melting beyond a preselected substrate depth and for assurance of limited grain growth of the higher melting (and therefore first reprecipitated phase (e.g., silicon in a silicon-aluminum alloy casing).

The casing of the resultant product is unique in its high density, high adhesion, microstructure and metallurgical diffusion bond compared to flame or plasma sprayed and other state of the art processing and their products.

The coating material has a melting point or liquidus of 1000° C. or at least 200° C. higher, and preferably much higher, than the substrates.

According to a further aspect of the process of the invention, a microscopic hardness depth profile taken at very small increments would show drastically different hardness; i.e., many alternating peaks and troughs with the silicon or other coating material primary particles having higher hardness (being on a higher Rockwell scale) than intervening areas of the matrix.

The invention may further be utilized in connection with substrate grain refinement apart from formation of a casing with an applied coating.

Castings and wrought products normally exhibit inclusions such as intermetallic compounds, oxides and sulfides, besides containing pores. These defects if present near the surface, can alter the fatigue strength, corrosion resistance, and wear characteristics of a workpiece. Therefore, a desired grain structure and a more homogeneous chemical composition are sought at desired locations of the surface. For example, if a small part of a large workpiece is subject to high wear and/or corrosion, and fatigue, it would be most desirable to have a fine grain structure and uniformly dispersed alloying inclusions.

With state of the art technology, grain refinement can be achieved by suitable thermomechanical treatment, which of course is carried out in the solid state. Therefore, this process takes several hours, and a large quantity of heat energy to accomplish. Also, by this treatment, the entire workpiece gets grain refined.

Sweeping the surface with a CW output laser beam makes it possible to obtain refined structure. The beam is controlled to produce rapid melting, followed by rapid solidification. Because this process is carried out in the liquid state, it is significantly faster.

The surface of a low-cost workpiece can be locally melted up to a predetermined depth with a laser beam. Thus the surface temperature can be brought to 200° to 400° C. above the melting point. The superheated molten liquid at the surface will dissolve inclusions while becoming chemically homogeneous whereas more importantly, the bulk of the workpiece is at room temperature. Consequently, due to rapid heat extraction from the molten liquid, (the total heat up and cool down to 50% melting point occurring within two seconds) the rate of nucleation of the solid from liquid occurs at a rapid rate. Before the nuclei can grow to large size, the entire liquid is completely frozen. Thus a fine dendritic structure consisting of fine inclusions are obtained. Also, the chemical composition of the structure will be more uniform than before treatment.

As an example, an aluminum alloy AA 390 containing large primary silicon inclusions was treated by melting the surface to a depth of about 1 mm by applying 27.8 $kW/cm^2$ at a processing speed of 20 in/min. The beam dwell time was 0.4 to 0.5 s. It is estimated that the cooling rate near the freezing point of the alloy was $10^3$ to $10^4$°C/s, based on the size of dendrite arm spacing; i.e. about 5 $\mu$m. Since the aluminum surface has a very high reflectivity for 10.6 $\mu$m wave length laser beam, it was coated with an energy absorber by treating with about 10 percent sodium hydroxide solution for about 10 minutes to develop a black oxide or hydroxide coating. The coated surface was rinsed with cold water and dried thoroughly before laser processing.

Photomicrographs of FIGS. 7 and 8 show the condition of the workpiece surface (a layer of about 1 mm average thickness) before and after processing. Before processing, angular primary silicon particles as large as 60 $\mu$m can be observed along with the aluminum-silicon eutectic; the work surface shows some roughness. After processing, the structure possesses fine angular silicon particles about 1 to 4 $\mu$m in size dispersed uniformly in the aluminum alloy matrix; also the roughness of the edge has been completely eliminated.

Generally, the treatment can be applied to $\frac{1}{8}$ to 3 mm thick surface layers, preferably about 1 mm, using a beam dwell of less than a second; preferably about half a second. The "dwell" is not based on stopping the beam, but reflects the speed of a continuously moving beam and diameter of the beam, impinging on the surface to be treated producing 5–100 kilowatt second per square centimeter of treated surface. The energy input is tailored to a particular metal and the depth of melting desired. Shielding gas is provided as described above in connection with use of a high melting point coating.

The grain refining can be applied as a second step after the first step of forming a casing as described above in connection with FIGS. 1-6. The rescanning by a laser beam involves an even faster heat up and cool down time than in the original casing formation to produce 10% or more factor of grain refinement in the finished product. This preferably involves a higher scan speed and/or lower power density input in the second step than in the first step, supplemented by the better heat transfer through the metallurgical bond of the casing to substrate compared to interface heat transfer conditions found in the first step.

It is evident that those skilled in the art, once given the benefit of the foregoing disclosure, may now make numerous other uses and modifications of, and departures from the specific embodiments described herein without department from the inventive concepts. Consequently, the invention is to be construed as embracing each and every novel feature and novel combination of features present in, or possessed by, the apparatus and techniques herein disclosed and limited solely by the scope and spirit of the appended claims.

What is claimed is:

1. Surface layer alloy casing production method comprising,
   coating a preselected area of a metal substrate with a metal layer, the substrate thickness being such to constitute a virtually infinite heat sink relative to the coating,
   the coating metal liquidus or melting point being at least 200° C. higher than that of the substrate,
   scanning said area with a laser beam at speed and power density which in conjunction with conductivity of the selected substrate material provides a rapid heatup including melting of the entire coating and a predetermined thickness of the subtrate corresponding to its share of the alloy casing in less than two seconds and rapid cool down and resolidification of the melt to produce a 99% of theoretical density alloy casing entirely incorporating said coated-on metal layer and said sustrate thickness which is melted, with particles of the coating material in a matrix of a eutectic of coating and substrate materials metallurgically diffusion bonded to the substrate, said particles of the original coating material being concentrated upwardly within said casing and preventing oxidation of the melt,
   the process being controlled to induce a substantial mixing of the entirely melted coating and melted substrate layer and a precipitation out of particles of the original coating material into said matrix before the matrix freezes.

2. Surface layer production method in accordance with claim 1 and further comprising control of conditions to produce a grain refined layer of substrate adjacent said casing.

3. Surface layer production method in accordance with claim 1 wherein the substrate is selected from the class consisting of metals and alloys which melt (or have a liquidus temperature) at 400°-800° C. and the coating is selected from the class consisting of metals and alloys which melt (or have a liquidus temperature) above 1000° C.

4. Surface layer production method in accordance with claim 3 wherein the substrate is selected from class consisting of aluminum and magnesium and their alloys.

5. Surface layer production method in accordance with claim 4 wherein the coating material is selected from the class consisting of elements and alloyed forms of silicon, iron, nickel cobalt, molybdenum, tungsten, chromium, vanadium, zirconium, hafnium, tantalum, columbium, titanium, boron, beryllium, palladium, rhodium, rhenium, iridium, platinum, copper, gold, manganese, osmium.

6. Surface layer production method in accordance with claim 1 wherein the coating material is selected from the class consisting of elements and alloyed forms of silicon, iron, nickel, cobalt, molybdenum, tungsten, chrominum, vanadium, zirconium, hafnium, tantalum, columbium, titanium, boron, beryllium, palladium, rhodium, rhenium, iridium, platinum, copper gold, manganese, osmium.

7. Surface layer production method in accordance with claim 6 wherein the substrate comprises aluminum and the coating comprises silicon.

8. Surface layer production method in accordance with claim 1 wherein the original coating has a thickness of 10-100 mils.

9. Surface layer production method in accordance with claim 1 wherein original coating is of consolidated form.

10. Surface layer production method in accordance with claim 1 wherein original coating is of loose powder form.

11. Product as made by the process of claim 1.

12. Surface layer production method comprising,
    coating a higher melting coating metal on a lower melting metal substrate and rapidly scanning a high power density laser beam under shielding gas environment on said coating to melt it entirely and a predetermined depth of the substrate to mix the melt and resolidify rapidly to produce an alloy casing entirely incorporating such melted coating and said melted substrate depth and comprised of precipitated particles of said coating in a matrix of an essentially eutectic mixture of coating and melted substrate,
    then subsequently rapidly rescanning a high power density laser beam over said casing to remelt and resolidify it even more rapidly thereby reducing the size of said particles by a factor of at least 10X,
    the process being controlled to induce a substantial mixing of the entirely melted coating and melted substrate layer and a precipitation out of particles of the original coating material into said matrix before the matrix freezes.

13. Surface layer production method in accordance with claim 12 wherein the substrate is selected from the class consisting of metals and alloys which melt (or have a liquidus temperature) at 400°-800° C. and the coating is selected from the class consisting of metals and alloys which melt (or have a liquidus temperature) above 1000° C.

14. Surface layer production method in accordance with claim 13 wherein the substrate is selected from the class consisting of aluminum and magnesium and their alloys.

15. Surface layer production method in accordance with claim 14 wherein the substrate comprises aluminum.

16. Surface layer production method in accordance with claim 15 wherein the coating material is selected from the class consisting of elements and alloyed forms of silicon, iron, nickel, cobalt, molybdenum, tungsten, chromium, vanadium, zirconium, hafnium, tantalum, columbium, titanium, boron, beryllium, palladium, rhodium, rhenium, iridium, platinum, copper, gold, manganese, osmium.

* * * * *

UNITED STATES PATENT AND TRADEMARK OFFICE
CERTIFICATE OF CORRECTION

PATENT NO. : 4,401,726
DATED : August 30, 1983
INVENTOR(S) : Daniel S. Gnanamuthu It is certified that error appears in the above-identified patent and that said Letters Patent are hereby corrected as shown below:

Col. 1, line 19, after "aluminum" insert --or--;

Col. 1, line 31, delete "higher" and insert --high--; Col. 3, line 3, delete "10%" and insert --10X--; Col. 3, line 33, delete "100%" and insert --100X--; Col. 7, line 9, delete "10%" and insert --10X--; and Col. 7, line 42, delete "sustrate" and insert --substrate--.

Signed and Sealed this

First Day of November 1983

[SEAL]

Attest:

GERALD J. MOSSINGHOFF

Attesting Officer

Commissioner of Patents and Trademarks